(12) United States Patent
Nestorovic

(10) Patent No.: US 12,405,457 B2
(45) Date of Patent: Sep. 2, 2025

(54) REFLECTIVE PUPIL RELAY OPTICS FOR MEMS SCANNING SYSTEM

(71) Applicant: STMicroelectronics International N.V., Geneva (CH)

(72) Inventor: Nenad Nestorovic, Seattle, WA (US)

(73) Assignee: STMicroelectronics International N.V., Geneva (CH)

( * ) Notice: Subject to any disclaimer, the term of this patent is extended or adjusted under 35 U.S.C. 154(b) by 785 days.

(21) Appl. No.: 17/699,958

(22) Filed: Mar. 21, 2022

(65) Prior Publication Data

US 2023/0296868 A1    Sep. 21, 2023

(51) Int. Cl.
| | |
|---|---|
| G02B 17/06 | (2006.01) |
| G01S 7/481 | (2006.01) |
| G02B 6/42 | (2006.01) |
| G02B 17/02 | (2006.01) |
| G02B 26/08 | (2006.01) |
| G02B 26/10 | (2006.01) |
| G02B 27/01 | (2006.01) |

(52) U.S. Cl.
CPC ........ G02B 17/0657 (2013.01); G01S 7/4817 (2013.01); G02B 6/4215 (2013.01); G02B 17/023 (2013.01); G02B 26/0833 (2013.01); G02B 26/101 (2013.01); G02B 27/0172 (2013.01); *G02B 2027/011* (2013.01)

(58) Field of Classification Search
CPC .... G02B 26/00–129; G02B 27/00–648; G02B 2027/0105–0198; G03B 21/00–64
See application file for complete search history.

(56) References Cited

U.S. PATENT DOCUMENTS

| | | | |
|---|---|---|---|
| 10,969,675 B1 * | 4/2021 | Wheelwright | ..... G02B 27/0172 |
| 2018/0299666 A1 | 10/2018 | Nestorovic et al. | |
| 2019/0278076 A1 | 9/2019 | Chen et al. | |
| 2021/0227187 A1 * | 7/2021 | Stanley | ............. G02B 17/0605 |

OTHER PUBLICATIONS

EPO Search Report and Written Opinion for counterpart EP Appl. No. 23160863.9, report dated Jul. 27, 2023, 7 pgs.
De Wit, Gerard C., et al.: "Offner-type pupil relay optics for a scanning system," Laser-Based Micro-and Nanopackaging and Assembly II, vol. 2774, Aug. 23, 1996, pp. 553-561, XP093067420.

* cited by examiner

*Primary Examiner* — Christopher A Lamb, II
(74) *Attorney, Agent, or Firm* — Crowe & Dunlevy LLC

(57) ABSTRACT

An optical module includes a fast-axis mirror that scans a laser beam along a fast-axis, a magnification mirror set formed by three discrete mirrors shaped to magnify the laser beam as it is scanned along the fast-axis and reflect the laser beam after magnification toward a slow-axis mirror that scans the laser beam along the slow-axis, and an Offner mirror relay that receives the laser beam as it is scanned along the slow-axis and reflects the laser beam out an exit aperture. The laser beam as output from the exit aperture is received at an input diffractive grating of a diffractive waveguide, with a user's eye being positioned adjacent an output diffractive grating of the waveguide such that the user's eye views ambient light entering the waveguide from objects within the user's field of view as well as light from the laser beam as it exits the output diffractive grating.

20 Claims, 3 Drawing Sheets

REFLECTIVE PUPIL RELAY OPTICS FOR MEMS SCANNING SYSTEM

TECHNICAL FIELD

This disclosure is related to the field of optics for use in laser scanning projectors.

BACKGROUND

A laser scanning projector is a small, portable electronic device. Laser scanning projectors are typically paired to, or incorporated within, user devices such as smart glasses, smartphones, tablets, laptops, and head mounted devices, and are used to project images onto a projection surface, such as a wall, holographic surface, or inner display surface of virtual or augmented reality glasses. Laser scanning projectors are also used in depth sensing cameras and Light Detection and Ranging (LIDAR) systems.

In the context of their use to project images, such laser scanning projectors typically include a projection subsystem and an optical module. The paired user device serves an image stream (e.g., a video stream) to the projection subsystem. The projection subsystem properly drives the optical module to project the image stream onto the projection surface for viewing.

In the context of their use in depth sensing cameras and LIDAR systems, the projection subsystem properly drives the optical module to project light pulses at a scene that reflect off objects in the scene. By measuring the time between emission of an emitted laser pulse and detection of photons of that laser pulse that have reflected off an object and been detected by a detector, a time of flight of the emitted laser pulse is determined. Given this time of flight and with the understanding of the direction of emission of the laser pulse, a three-dimensional map of objects in the scene can be formed and utilized.

Typical optical modules are comprised of a laser source and one or more microelectromechanical system (MEMS) mirrors that scan the laser beam produced by the laser source across the projection surface in a projection pattern. The projection subsystem controls the driving of the laser source and the driving of the movement of the one or more MEMS mirrors, and by modulating the laser beam according to its position on the projection surface, while the laser beam is scanned in the projection pattern, the image stream is displayed, or the light pulses are suitable directed at the scene.

Augmented reality systems function by allowing ambient light from a user's surroundings together with directing light displaying additional visual information toward the user's eye. A waveguide may be used to accomplish this mixing of ambient light and additional visual information in a way that is visible to the user. For example, the waveguide may receive ambient light from the user's surroundings and may have the additional information displayed thereon through the use of a laser scanning projector. The field of view of the visual information displayed to the user through the waveguide is related to the pupil size of the light directed onto the waveguide by the laser scanning projector. The larger the pupil size of the light directed onto the waveguide, generally, the more efficient the waveguide and the better the performance provided by the waveguide.

As such, further development into optical modules for generating the light with a larger pupil size is desired.

SUMMARY

Disclosed herein is an optical system including an optical module, diffractive waveguide, and control circuitry. The optical module includes a RGB laser source configured to generate a combined RGB laser beam, a fast axis mirror arranged along a first path to receive the combined RGB laser beam and being drivable to scan the combined RGB laser beam along a fast axis, three optical surface magnification mirrors receiving the combined RGB laser beam as it is scanned along the fast axis and magnifying a diameter of the combined RGB laser beam, a slow axis mirror receiving the combined RGB laser beam after magnification and being drivable to scan the combined RGB laser beam along a slow axis, and an Offner mirror relay receiving the combined RGB laser beam as it is scanned along the slow axis and reflecting the combined RGB laser beam along a second path toward an exit aperture of the optical module. The diffractive waveguide has an input diffractive grating defined therein and is positioned such that the combined RGB laser beam passes from the exit aperture of the optical module into the input diffractive grating, the diffractive waveguide having an output diffractive grating to be positioned adjacent to a user's eye. The control circuitry is configured to modulate the RGB laser source according to input image data so that as the combined RGB laser beam is scanned along the fast axis and slow axis, images represented by the input image data are visible to the user's eye.

A first folding mirror may be configured to receive the combined RGB laser beam from the RGB laser source and reflecting the combined RGB laser beam along the first path.

A second folding mirror may be arranged along the second desired path and receive the combined RGB laser beam to reflect the combined RGB laser beam toward the exit aperture of the optical module.

The three optical surface magnification mirrors may be a first concave mirror receiving the combined RGB laser beam as it is scanned along the fast axis and reflecting the combined RGB laser beam along a first internal path, a first convex mirror arranged along the first internal path to receive the combined RGB laser beam and reflecting the combined RGB laser beam along a second internal path, and a second concave mirror arranged along the second internal path to receive the combined RGB laser beam and reflecting the combined RGB laser beam toward the slow axis mirror. The first concave mirror, the first convex mirror, and the second concave mirror may cooperate to magnify the diameter of the combined RGB laser beam.

The Offner mirror relay may include a spherical concave mirror receiving the combined RGB laser beam as it is scanned along the slow axis and reflecting the combined RGB laser beam along a third internal path, and a spherical convex mirror arranged along the third internal path to receive the combined RGB laser beam and reflecting the combined RGB laser beam along a fourth internal path different than the third internal path back toward the spherical concave mirror. The spherical concave mirror may reflect the combined RGB laser beam, as received along the fourth internal path, toward the exit aperture of the optical module.

The fast axis mirror may be a first microelectromechanical system (MEMS) micromirror configured to be driveable at resonance to scan the combined RGB laser beam along the fast axis.

The slow axis mirror may be a second MEMS micromirror configured to be driveable linearly to scan the combined RGB laser beam along the slow axis.

Also disclosed herein is an optical module including a fast axis mirror arranged along a first path to receive a combined RGB laser beam and being drivable to scan the combined RGB laser beam along a fast axis, and three optical surface magnification mirrors receiving the combined RGB laser beam as it is scanned along the fast axis. The three optical surface magnification mirrors include a first concave mirror receiving the combined RGB laser beam as it is scanned along the fast axis and reflecting the combined RGB laser beam along a first internal path, a first convex mirror arranged along the first internal path to receive the combined RGB laser beam and reflecting the combined RGB laser beam along a second internal path, and a second concave mirror arranged along the second internal path to receive the combined RGB laser beam and reflecting the combined RGB laser beam toward the slow axis mirror. The first concave mirror, the first convex mirror, and the second concave mirror cooperate to magnify a diameter of the combined RGB laser beam. A slow axis mirror receives the combined RGB laser beam after magnification, the slow axis mirror being drivable to scan the combined RGB laser beam along a slow axis. An Offner mirror relay receives the combined RGB laser beam as it is scanned along the slow axis and reflecting the combined RGB laser beam along a second path toward an exit aperture of the optical module.

The Offner mirror relay may be formed by a spherical concave mirror receiving the combined RGB laser beam as it is scanned along the slow axis and reflecting the combined RGB laser beam along a third internal path, and a spherical convex mirror arranged along the third internal path to receive the combined RGB laser beam, the spherical convex mirror reflecting the combined RGB laser beam along a fourth internal path different than the third internal path back toward the spherical concave mirror. The spherical concave mirror may reflect the combined RGB laser beam, as received along the fourth internal path, toward the exit aperture of the optical module.

A RGB laser source may be configured to generate the combined RGB laser beam.

A first folding mirror may be configured to receive the combined RGB laser beam from the RGB laser source and reflect the combined RGB laser beam along the first path.

A second folding mirror may be arranged along the second desired path and receive the combined RGB laser beam to reflect the combined RGB laser beam toward the exit aperture of the optical module.

The fast axis mirror may be a first microelectromechanical systems (MEMS) micromirror configured to be driveable at resonance to scan the combined RGB laser beam along the fast axis, and the slow axis mirror may be a second MEMS micromirror configured to be driveable linearly to scan the combined RGB laser beam along the slow axis.

Also disclosed herein is an optical module including a RGB laser source configured to generate a combined RGB laser beam, a first folding mirror configured to receive the combined RGB laser beam from the RGB laser source and reflecting the combined RGB laser beam along the first path, a fast axis microelectromechanical systems (MEMS) mirror arranged along the first path to receive the combined RGB laser beam and being drivable to scan the combined RGB laser beam along a fast axis, three optical surface magnification mirrors receiving the combined RGB laser beam as it is scanned along the fast axis and magnifying a diameter of the combined RGB laser beam, a slow axis MEMS mirror receiving the combined RGB laser beam after magnification and being drivable to scan the combined RGB laser beam along a slow axis, an Offner mirror relay receiving the combined RGB laser beam as it is scanned along the slow axis and reflecting the combined RGB laser beam along a second path toward an exit aperture of the optical module, and a second folding mirror arranged along the second desired path and receiving the combined RGB laser beam to reflect the combined RGB laser beam toward the exit aperture of the optical module.

The three optical surface magnification mirrors may be a first concave mirror receiving the combined RGB laser beam as it is scanned along the fast axis and reflecting the combined RGB laser beam along a first internal path, a first convex mirror arranged along the first internal path to receive the combined RGB laser beam and reflecting the combined RGB laser beam along a second internal path, and a second concave mirror arranged along the second internal path to receive the combined RGB laser beam and reflecting the combined RGB laser beam toward the slow axis mirror. The first concave mirror, the first convex mirror, and the second concave mirror may cooperate to magnify a diameter of the combined RGB laser beam;

The Offner mirror relay may be formed by a spherical concave mirror receiving the combined RGB laser beam as it is scanned along the slow axis and reflecting the combined RGB laser beam along a third internal path, and a spherical convex mirror arranged along the third internal path to receive the combined RGB laser beam, the spherical convex mirror reflecting the combined RGB laser beam along a fourth internal path different than the third internal path back toward the spherical concave mirror.

Also disclosed herein is an optical system including an optical module. The optical module includes a laser source configured to generate a laser beam, a first axis mirror arranged along a first path to receive the laser beam and being drivable to scan the laser beam along a first axis, three optical surface magnification mirrors receiving the laser beam as it is scanned along the first axis and magnifying a diameter of the laser beam, a second axis mirror receiving the laser beam after magnification and being drivable to scan the laser beam along a second axis, and an Offner mirror relay receiving the laser beam as it is scanned along the slow axis and reflecting the laser beam along a second path toward an exit aperture of the optical module.

The three optical surface magnification mirrors may include a first concave mirror receiving the laser beam as it is scanned along the first axis and reflecting the laser beam along a first internal path, a first convex mirror arranged along the first internal path to receive the laser beam, the first convex mirror reflecting the laser beam along a second internal path, and a second concave mirror arranged along the second internal path to receive the laser beam, the second concave mirror reflecting the laser beam toward the second axis mirror. The first concave mirror, the first convex mirror, and the second concave mirror may cooperate to magnify the diameter of the laser beam.

The Offner mirror relay may be formed by a spherical concave mirror receiving the laser beam as it is scanned along the second axis and reflecting the laser beam along a third internal path, and a spherical convex mirror arranged along the third internal path to receive the laser beam, the spherical convex mirror reflecting the laser beam along a fourth internal path different than the third internal path back toward the spherical concave mirror. The spherical concave mirror may reflect the laser beam, as received along the fourth internal path, toward the exit aperture of the optical module.

A light detector may be configured to detect light from the laser beam that has reflected off an object after traveling through the exit aperture of the optical module, and control circuitry may be configured to determine elapsed time between emission of the laser beam and detection of the light by the light detector, and to determine distance to the object based upon the elapsed time.

The first axis mirror may be a fast axis mirror, the first axis may be a fast axis, the second axis mirror may be a slow axis mirror, and the second axis may be a slow axis.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown but is to be accorded the widest scope consistent with the principles and features disclosed or suggested herein.

Figure 1:
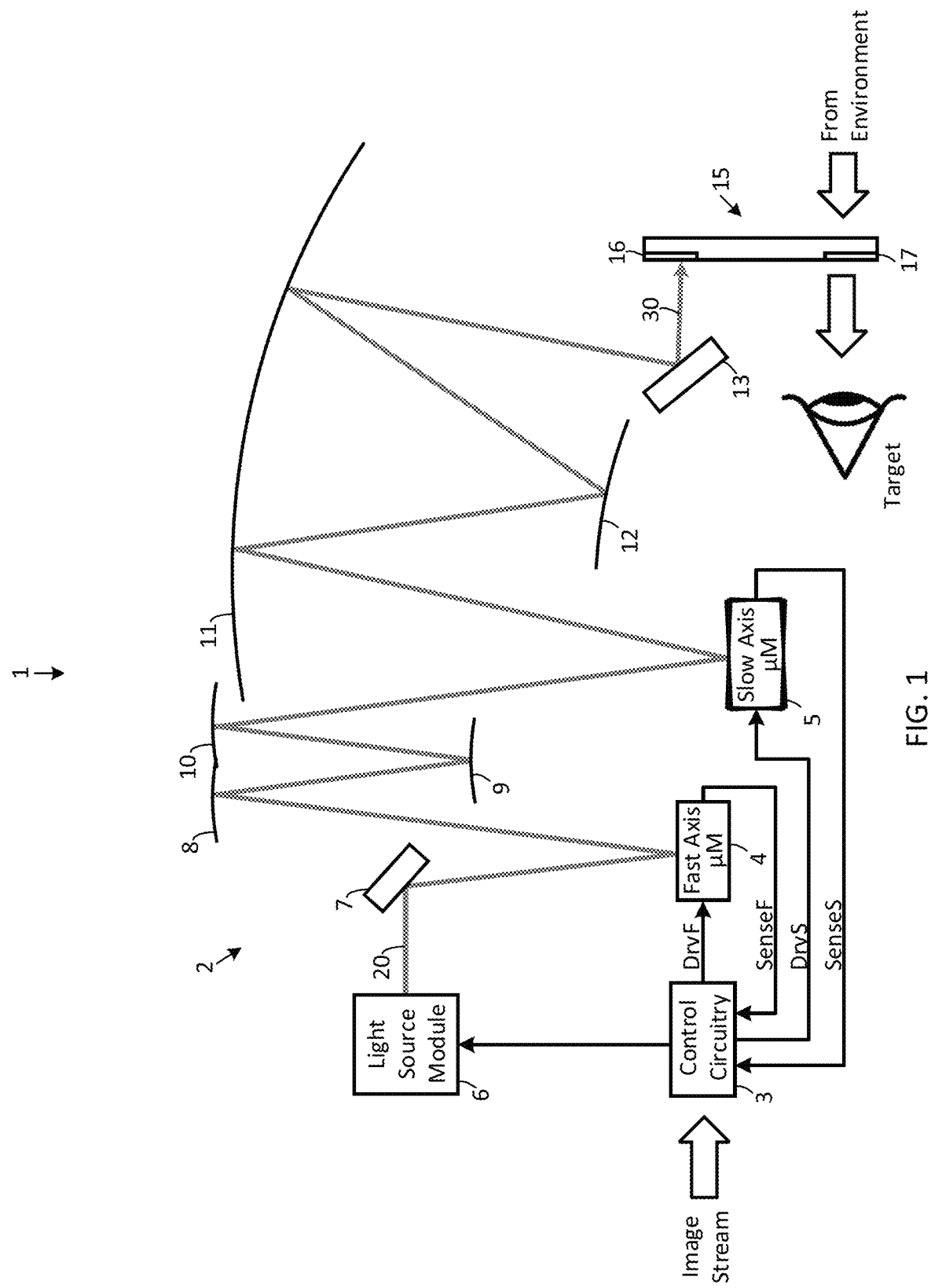
FIG. 1 is a diagrammatical representation of an augmented reality system disclosed herein.

Disclosed herein with reference to FIG. 1 is an augmented reality display system 1 which may be incorporated into a head mounted display worn by a user. The augmented reality system 1 permits the user to view their surroundings together with virtual visual information overlaid on top of the view of their surroundings.

The augmented reality display system 1 includes at least one waveguide 15 which is supported adjacent to the user's eye, and which serves to combine ambient light from the user's surroundings together with virtual visual information represented by an output RGB laser beam 30 incoupled to the waveguide 15 by an input 16 and outcouple the resulting augmented reality visual information to the user via the output 17 of the waveguide 15. The waveguide 15 may be a diffractive based waveguide, with the input 16 and output 17 being planar diffractive gratings defined on the surface of the waveguide 16.

The augmented reality display system 1 includes a fast axis microelectromechanical system (MEMS) micromirror 4 and a slow axis MEMS micromirror 5. The fast axis MEMS micromirror 4 is driven at resonance (e.g., at 22 KHz) by a drive signal DrvF while the slow axis MEMS micromirror 5 is driven linearly (e.g., at 60 Hz) by a drive signal DrvS. The fast axis MEMS micromirror 4 and slow axis MEMS micromirror 5 cooperate to cause scanning of the output RGB laser beam 30 in a raster pattern, with the fast axis MEMS micromirror 4 causing the scanning along the horizontal axis of the raster pattern and the slow axis MEMS micromirror 5 causing the scanning along the vertical axis of the raster pattern. Each complete raster pattern drawn represents one frame of an image to be displayed when viewed by the human eye.

Note here that the fast axis MEMS micromirror 4 scans the RGB laser beam 20 across a wide-angle span (e.g., wider than the angle that a typical fast axis MEMS micromirror would typically scan an incident beam along in such applications), and that the reflective surface of the fast axis MEMS micromirror 4 is greater in area than that of the slow axis MEMS micromirror 5.

Control circuitry 3 generates the drive signals DrvF and DrvS for the MEMS micromirrors 4 and 5 based upon respective feedback sense signals SenseF and SenseS received from the MEMS micromirrors 4 and 5 so as to maintain the driving of the MEMS micromirrors 4 and 5 at desired opening angles.

The control circuitry 3 generates control signals for the light source module 6 causing the light source module 6 to suitably modulate the color and intensity of the individual components making up the combined RGB laser beam 20, in correlation with the positions of the MEMS micromirrors 4 and 5, so that the image frames formed appear as instructed by an input image stream.

The augmented reality display system 1 includes an optical module 2 that generates and directs the output RGB laser beam 30 toward the waveguide 15. The optical module 2 is now described and includes a light source module 6 which generates a combined RGB (red, green, blue) laser beam 20 which is reflected by a folding mirror 7 toward the fast axis MEMS micromirror 4. The fast axis MEMS micromirror defines an input pupil diameter of the RGB laser beam 20.

The fast axis MEMS micromirror 4 reflects the RGB laser beam 20 toward a mirror 8 having a reflective surface with a concave cross section. The mirror 8 in turn reflects the RGB laser beam 20 toward a mirror 9 having a reflective surface with a convex cross section, which in turn reflects the RGB laser beam 20 toward a mirror 10 having a reflective surface with a concave cross section. The mirror 10 reflects the RGB laser beam 20 toward the slow axis MEMS micromirror 5. Collectively, the mirrors 8, 9, and 10 serve to magnify the RGB laser beam 20, to thereby define an output pupil diameter of the RGB laser beam as it impinges upon the slow axis MEMS micromirror 5. The output pupil diameter may be larger than the input pupil diameter by a ratio of 2:1, so that ultimately the diameter of the beam spot of the output RGB laser beam 30 as it is incident upon the input diffractive grating 16 is magnified by that 2:1 factor.

Another benefit provided by the mirrors 8, 9, and 10 is to lower the angle of incidence of the RGB laser beam 20 on the slow axis MEMS micromirror 5, lowering distortion in the final image produced.

The slow axis MEMS micromirror 5 reflects the RGB laser beam 20 toward an Offner relay formed by mirrors 11 and 12. In particular, the slow axis MEMS micromirror 5 reflects the RGB laser beam 20 toward the mirror 11, which has a reflective surface with a concave cross section. The mirror 11 reflects the RGB laser beam 20 toward the mirror 12, which has a reflective surface with a convex cross section. The mirror 12 reflects the RGB laser beam 20 back toward the mirror 11, which then reflects the RGB laser beam 20 toward a folding mirror 13. The folding mirror 13 in turn reflects the RGB laser beam as the output RGB laser beam 30 out of an exit aperture in the optical module 2 and into the input diffractive grating 16 of the waveguide 15.

As explained, the waveguide 16 combines the output RGB laser beam 30 incoupled via the input diffractive grating 16 together with ambient light from the environment and outcouples the result as augmented reality visual information to the user (target) via the output diffractive output grating 17.

The increase in pupil size provided by the optical module 2 serves to reduce the constraints on the waveguide 15 design, providing for enhanced performance, such as enabling the possibility of adding virtual images across the user's entire field of view. The increase in pupil size also increases waveguide efficiency by lowering power requirements for high brightness applications.

Variations of the optical module 2 design shown above are within the scope of this disclosure. For example, the mirrors 8, 9, 10, 11, and 12 are described as having reflective surfaces, but in some instances, one or more of the mirrors 8, 9, 10, 11, and 12 may instead be refractive elements. It may also be possible to remove one of the mirrors (for example, mirror 10). In addition, one or more of the mirrors 8, 9, 10, 11, and 12 may instead be a total internal reflection (TIR) based optic (and in such a case, chromatic error correction is to be performed).

Figure 2:
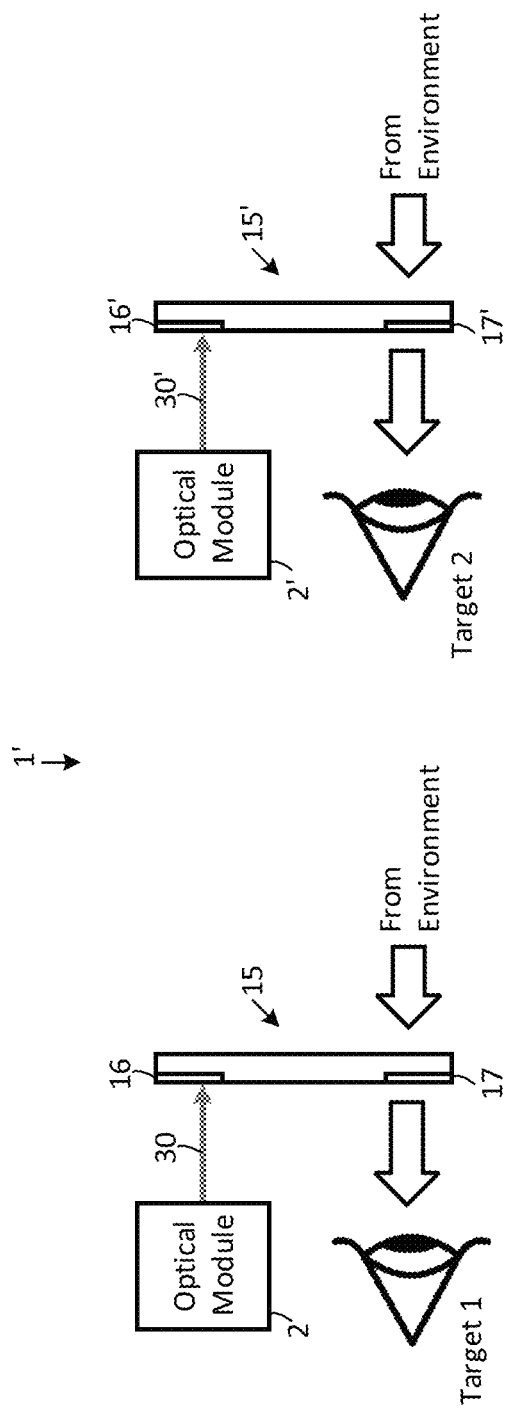
FIG. 2 is a block diagram of a second augmented reality system disclosed herein.

The augmented reality system 1 is described above with reference to having one such optical module 2 and one such waveguide 15, although it should be understood that it may instead include two such optical modules 2 and 2', and two such waveguides 15 and 15' so that one waveguide may be supported adjacent each of the user's eyes, as shown in FIG. 2

Figure 3:
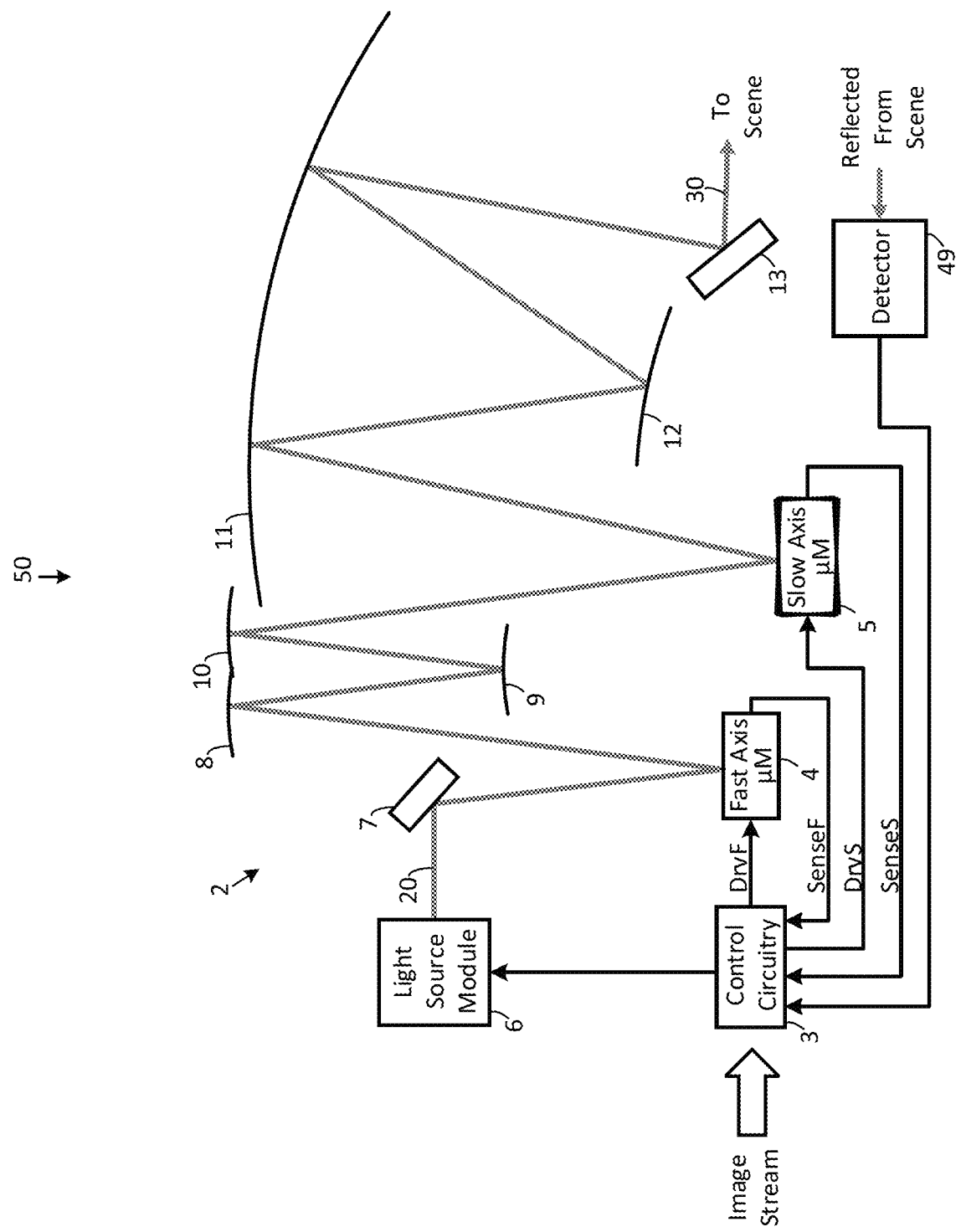
FIG. 3 is a diagrammatical representation of a LIDAR system disclosed herein.

The optical module 2 described above may be utilized in a light detection and ranging (LIDAR) system 50, as shown in FIG. 3. In such a case, the laser beam 20 is an infrared laser beam instead of a RGB laser beam, and the waveguide is not present. A light detector array 49 is added so that the time between emission of a pulse of the laser and detection of photons of that laser pulse that have reflected off an object and been detected by the detector can be determined by the control circuitry 3. Given this time of flight and with the understanding of where the laser beam was scanned at any instant in time, a three-dimensional map of objects in the field of view can be formed by the control circuitry 3 and utilized by hardware external to the LIDAR system 50.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An optical system, comprising:
   an optical module comprising:
      a RGB laser source configured to generate a combined RGB laser beam;
      a fast axis mirror arranged along a first path to receive the combined RGB laser beam, the fast axis mirror being drivable to scan the combined RGB laser beam along a fast axis;
      three optical surface magnification mirrors receiving the combined RGB laser beam as it is scanned along the fast axis and magnifying a diameter of the combined RGB laser beam;
      a slow axis mirror receiving the combined RGB laser beam after magnification, the slow axis mirror being drivable to scan the combined RGB laser beam along a slow axis; and
      an Offner mirror relay receiving the combined RGB laser beam as it is scanned along the slow axis and reflecting the combined RGB laser beam along a second path toward an exit aperture of the optical module;
   a diffractive waveguide having an input diffractive grating defined therein and being positioned such that the combined RGB laser beam passes from the exit aperture of the optical module into the input diffractive grating, the diffractive waveguide having an output diffractive grating to be positioned adjacent to a user's eye; and
   control circuitry configured to modulate the RGB laser source according to input image data so that as the combined RGB laser beam is scanned along the fast axis and slow axis, images represented by the input image data are visible to the user's eye.

2. The optical system of claim 1, further comprising:
   a first folding mirror configured to receive the combined RGB laser beam from the RGB laser source and reflecting the combined RGB laser beam along the first path.

3. The optical system of claim 1, further comprising: a second folding mirror arranged along the second path and receiving the combined RGB laser beam to reflect the combined RGB laser beam toward the exit aperture of the optical module.

4. The optical system of claim 1, wherein the three optical surface magnification mirrors comprise:
   a first concave mirror receiving the combined RGB laser beam as it is scanned along the fast axis and reflecting the combined RGB laser beam along a first internal path;
   a first convex mirror arranged along the first internal path to receive the combined RGB laser beam, the first convex mirror reflecting the combined RGB laser beam along a second internal path; and
   a second concave mirror arranged along the second internal path to receive the combined RGB laser beam, the second concave mirror reflecting the combined RGB laser beam toward the slow axis mirror;
   wherein the first concave mirror, the first convex mirror, and the second concave mirror cooperate to magnify the diameter of the combined RGB laser beam.

5. The optical system of claim 1, wherein the Offner mirror relay comprises:
   a spherical concave mirror receiving the combined RGB laser beam as it is scanned along the slow axis and reflecting the combined RGB laser beam along a third internal path; and
   a spherical convex mirror arranged along the third internal path to receive the combined RGB laser beam, the spherical convex mirror reflecting the combined RGB laser beam along a fourth internal path different than the third internal path back toward the spherical concave mirror;
   wherein the spherical concave mirror reflects the combined RGB laser beam, as received along the fourth internal path, toward the exit aperture of the optical module.

6. The optical system of claim 1,
   wherein the fast axis mirror is a first microelectromechanical system (MEMS) micromirror configured to be driven at resonance to scan the combined RGB laser beam along the fast axis; and
   wherein the slow axis mirror is a second MEMS micromirror configured to be driven linearly to scan the combined RGB laser beam along the slow axis.

7. An optical module, comprising:
   a fast axis mirror arranged along a first path to receive a combined RGB laser beam, the fast axis mirror being drivable to scan the combined RGB laser beam along a fast axis;

three optical surface magnification mirrors receiving the combined RGB laser beam as it is scanned along the fast axis, wherein the three optical surface magnification mirrors comprise:
  a first concave mirror receiving the combined RGB laser beam as it is scanned along the fast axis and reflecting the combined RGB laser beam along a first internal path;
  a first convex mirror arranged along the first internal path to receive the combined RGB laser beam, the first convex mirror reflecting the combined RGB laser beam along a second internal path; and
  a second concave mirror arranged along the second internal path to receive the combined RGB laser beam, the second concave mirror reflecting the combined RGB laser beam toward a slow axis mirror;
  wherein the first concave mirror, the first convex mirror, and the second concave mirror cooperate to magnify a diameter of the combined RGB laser beam;
the slow axis mirror receiving the combined RGB laser beam after magnification, the slow axis mirror being drivable to scan the combined RGB laser beam along the slow axis; and
an Offner mirror relay receiving the combined RGB laser beam as it is scanned along the slow axis and reflecting the combined RGB laser beam along a second path toward an exit aperture of the optical module.

8. The optical module of claim 7, wherein the Offner mirror relay comprises:
  a spherical concave mirror receiving the combined RGB laser beam as it is scanned along the slow axis and reflecting the combined RGB laser beam along a third internal path; and
  a spherical convex mirror arranged along the third internal path to receive the combined RGB laser beam, the spherical convex mirror reflecting the combined RGB laser beam along a fourth internal path different than the third internal path back toward the spherical concave mirror;
  wherein the spherical concave mirror reflects the combined RGB laser beam, as received along the fourth internal path, toward the exit aperture of the optical module.

9. The optical module of claim 7, further comprising a RGB laser source configured to generate the combined RGB laser beam.

10. The optical module of claim 9, further comprising: a first folding mirror configured to receive the combined RGB laser beam from the RGB laser source and reflecting the combined RGB laser beam along the first path.

11. The optical module of claim 7, further comprising: a second folding mirror arranged along the path and receiving the combined RGB laser beam to reflect the combined RGB laser beam toward the exit aperture of the optical module.

12. The optical module of claim 7,
  wherein the fast axis mirror is a first microelectromechanical systems (MEMS) micromirror configured to be driven at resonance to scan the combined RGB laser beam along the fast axis; and
  wherein the slow axis mirror is a second MEMS micromirror configured to be driven linearly to scan the combined RGB laser beam along the slow axis.

13. An optical module, comprising:
  a RGB laser source configured to generate a combined RGB laser beam;
  a first folding mirror configured to receive the combined RGB laser beam from the RGB laser source and reflecting the combined RGB laser beam along a first path; and
  a fast axis microelectromechanical systems (MEMS) mirror arranged along the first path to receive the combined RGB laser beam, the fast axis mirror being drivable to scan the combined RGB laser beam along a fast axis;
  three optical surface magnification mirrors receiving the combined RGB laser beam as it is scanned along the fast axis and magnifying a diameter of the combined RGB laser beam;
  a slow axis MEMS mirror receiving the combined RGB laser beam after magnification, the slow axis mirror being drivable to scan the combined RGB laser beam along a slow axis;
  an Offner mirror relay receiving the combined RGB laser beam as it is scanned along the slow axis and reflecting the combined RGB laser beam along a second path toward an exit aperture of the optical module; and
  a second folding mirror arranged along the second path and receiving the combined RGB laser beam to reflect the combined RGB laser beam toward the exit aperture of the optical module.

14. The optical module of claim 13, wherein the three optical surface magnification mirrors comprise:
  a first concave mirror receiving the combined RGB laser beam as it is scanned along the fast axis and reflecting the combined RGB laser beam along a first internal path;
  a first convex mirror arranged along the first internal path to receive the combined RGB laser beam, the first convex mirror reflecting the combined RGB laser beam along a second internal path; and
  a second concave mirror arranged along the second internal path to receive the combined RGB laser beam, the second concave mirror reflecting the combined RGB laser beam toward the slow axis mirror;
  wherein the first concave mirror, the first convex mirror, and the second concave mirror cooperate to magnify a diameter of the combined RGB laser beam.

15. The optical module of claim 13, wherein the Offner mirror relay comprises:
  a spherical concave mirror receiving the combined RGB laser beam as it is scanned along the slow axis and reflecting the combined RGB laser beam along a third internal path; and
  a spherical convex mirror arranged along the third internal path to receive the combined RGB laser beam, the spherical convex mirror reflecting the combined RGB laser beam along a fourth internal path different than the third internal path back toward the spherical concave mirror.

16. An optical system, comprising:
an optical module comprising:
  a laser source configured to generate a laser beam;
  a first axis mirror arranged along a first path to receive the laser beam, the first axis mirror being drivable to scan the laser beam along a first axis;
  three optical surface magnification mirrors receiving the laser beam as it is scanned along the first axis and magnifying a diameter of the laser beam;
  a second axis mirror receiving the laser beam after magnification, the second axis mirror being drivable to scan the laser beam along a second axis; and an Offner mirror relay receiving the laser beam as it is scanned along the second axis and reflecting the laser beam along a second path toward an exit aperture of the optical module.

17. The optical system of claim 16, wherein the three optical surface magnification mirrors comprise:
a first concave mirror receiving the laser beam as it is scanned along the first axis and reflecting the laser beam along a first internal path;
a first convex mirror arranged along the first internal path to receive the laser beam, the first convex mirror reflecting the laser beam along a second internal path; and
a second concave mirror arranged along the second internal path to receive the laser beam, the second concave mirror reflecting the laser beam toward the second axis mirror;
wherein the first concave mirror, the first convex mirror, and the second concave mirror cooperate to magnify the diameter of the laser beam.

18. The optical system of claim 16, wherein the Offner mirror relay comprises:

a spherical concave mirror receiving the laser beam as it is scanned along the second axis and reflecting the laser beam along a third internal path; and
a spherical convex mirror arranged along the third internal path to receive the laser beam, the spherical convex mirror reflecting the laser beam along a fourth internal path different than the third internal path back toward the spherical concave mirror;
wherein the spherical concave mirror reflects the laser beam, as received along the fourth internal path, toward the exit aperture of the optical module.

19. The optical system of claim 16, further comprising:
a light detector configured to detect light from the laser beam that has reflected off an object after traveling through the exit aperture of the optical module; and
control circuitry configured to determine elapsed time between emission of the laser beam and detection of the light by the light detector, and to determine distance to the object based upon the elapsed time.

20. The optical system of claim 16, wherein the first axis mirror is a fast axis mirror; wherein the first axis is a fast axis; wherein the second axis mirror is a slow axis mirror; and wherein the second axis is a slow axis.

\* \* \* \* \*